United States Patent
Wiltse

[15] 3,698,117
[45] Oct. 17, 1972

[54] TIP-UP
[72] Inventor: Donald G. Wiltse, Madison Heights, Mich.
[73] Assignee: Topper Corporation, Madison Heights, Mich.
[22] Filed: July 27, 1971
[21] Appl. No.: 166,484

[52] U.S. Cl. ............................................. 43/17
[51] Int. Cl. ..................................... A01k 97/12
[58] Field of Search ................................. 43/17

[56] References Cited

UNITED STATES PATENTS

| | | | |
|---|---|---|---|
| D196,888 | 11/1963 | Pilsner | 43/17 X |
| 1,253,746 | 1/1918 | Teeling | 43/17 |
| 2,876,579 | 3/1959 | Plouffe | 43/17 |
| 3,134,186 | 5/1964 | Krueger | 43/17 |
| 3,230,655 | 1/1966 | Nomsen | 43/17 |

Primary Examiner—Samuel Koren
Assistant Examiner—Daniel J. Leach
Attorney—L. Gaylord Hulbert et al.

[57] ABSTRACT

A tip-up for use in ice fishing which comprises a housing containing a rotatable reel having a fishing line wound thereon, a crank for rotating the reel, a signal member pivoted on the reel on an axis offset from the axis of rotation of the reel and extending through a slot in the housing, the upper end of the signal member having a visual signal portion which oscillates externally of the housing when a fish takes the line off of the reel, and means for yieldably resisting unwinding of the reel. The housing is hollow and is adapted to completely cover the hole in the ice to retard freezing of the water therein.

9 Claims, 3 Drawing Figures

PATENTED OCT 17 1972
3,698,117
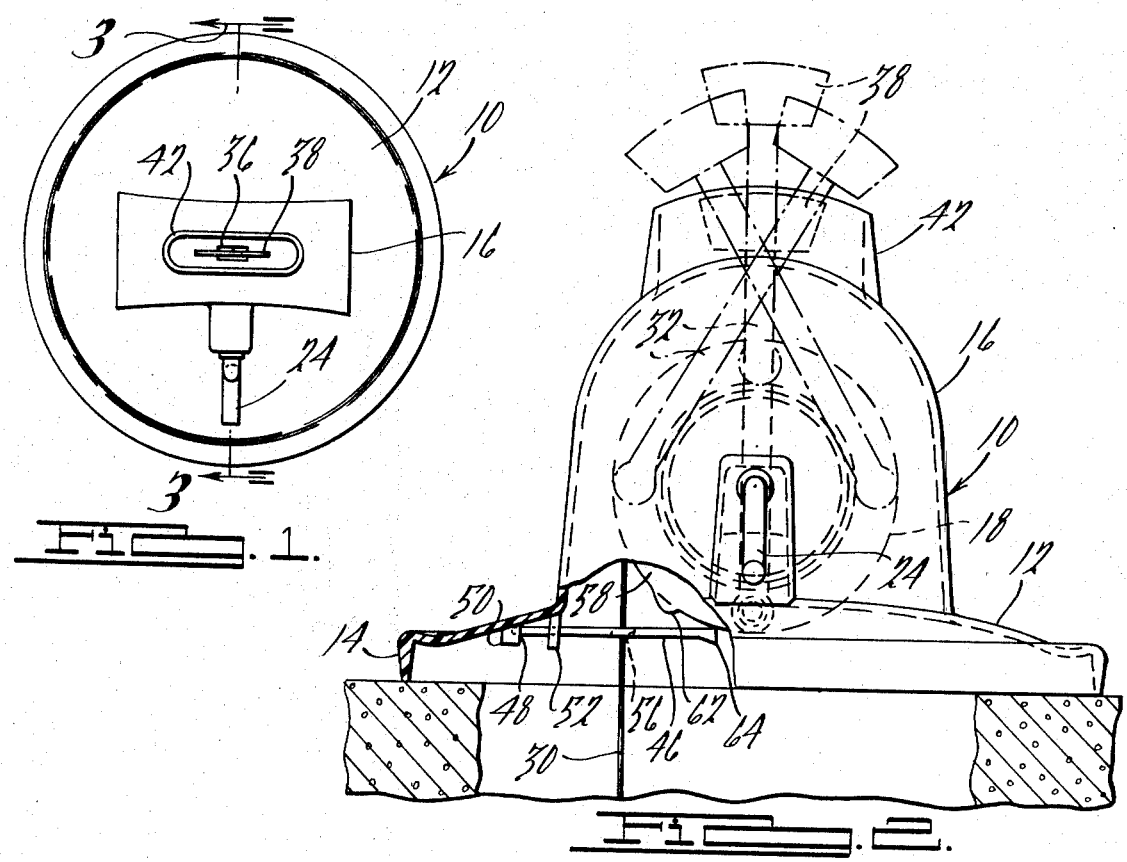
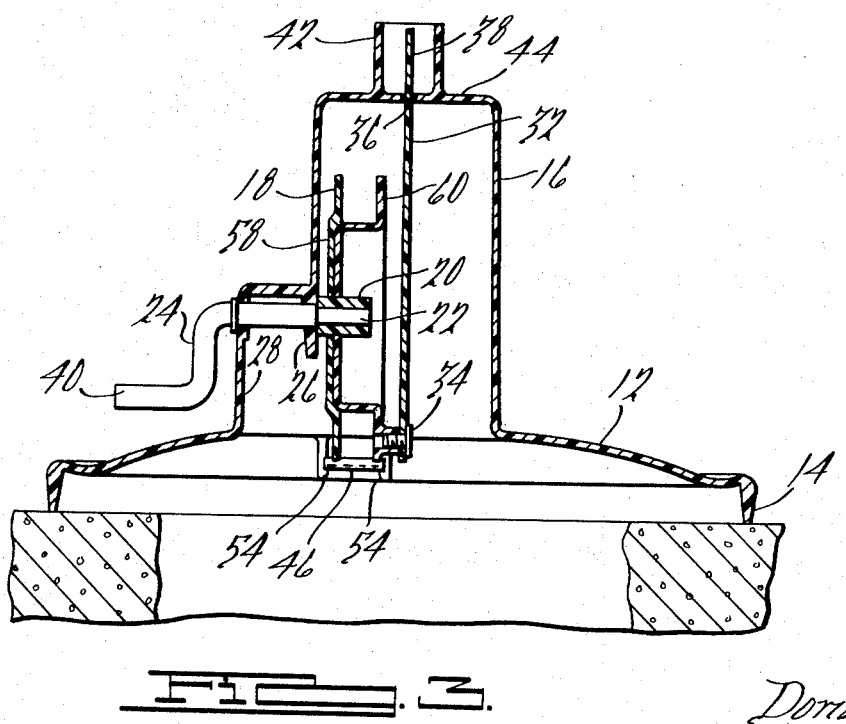
INVENTOR.
Donald G. Wiltse
BY Whittemore
Hulbert & Belknap
ATTORNEYS

TIP-UP

Tip-ups are commonly used in fishing through the ice to provide a visual signal when a fish has been caught. In prior devices of this type the signal comprises a flag or the like which is triggered to a vertical position when a fish strikes the line and the signal flag thereafter remains in a stationary position. The present invention is directed to a device of this type in which the signal flag is adapted to continually oscillate as the fish takes the line from the reel so as to more readily draw attention to the fact that a fish has been caught. A further feature of the invention is the provision of the hollow housing which contains the reel on which the line is wound, with the housing having a circular base positionable over the hole in the ice so that the water is not exposed to the atmosphere and therefore will not freeze up as frequently happens with prior devices.

In the drawings:

FIG. 1 is a top plan view of a tip-up constructed according to the present invention;

FIG. 2 is a side elevational view with parts broken away and showing the tip-up in place over a hole in the ice; and FIG. 3 is a sectional view taken on line 3—3 of FIG. 1.

The tip-up comprises a hollow housing indicated generally at 10 which is preferably made of plastic and which includes a circular base 12 having a downwardly extending rim 14 which is adapted to engage the ice around the opening therein. The housing 10 further includes an upwardly extending portion 16 which is adapted to contain a fishing reel 18.

The reel 18 includes a hub 20 which is frictionally secured on the inner end 22 of a crank 24. The crank 24 is rotatably mounted on the housing 10 and extends through aligned openings in spaced wall portions 26 and 28 of the upper portion 16 of the housing. A fishing line 30 is wound on the reel 18 and may be wound onto or unwound from the reel by operation of the crank 24.

A signal member 32 is detachably connected at its lower end to the reel 18 by means of a screw 34 or any other suitable pivotal connection. The signal member 32 extends through a slot 36 in the top wall of the housing portion 16 and carries a visual signal flag portion 38 at its upper end. When the line 30 is properly baited and lowered into the water to the desired depth by means of the crank 24, the crank should be positioned so that the pivotal connection 34 of the signal member 32 will be at the bottom of its path of rotation so that the visual signal flag portion 38 of the member 32 will be obscured by the wall 42 which extends upwardly from the top wall 44 of housing portion 16.

When a fish strikes the line 30 the reel 18 will rotate as the fish takes the line off the reel, and rotation of the reel will cause oscillation of the member 32 as shown by the dotted line positions thereof in FIG. 2. The signal portion 38 of the member 32 will be extended above the housing portion 42 except when the pivot point 34 reaches the lowest point of its path of rotation so that the signal flag 38 will continually oscillate and will be visible as the fish takes the line from the reel.

A drag plate 46 is detachably secured to the under side of the base 12 of the housing 10. The end 48 of the plate 46 extends into an opening in a boss 50, and a pair of lugs 52 extend downwardly along opposite sides of the plate 46 and have ledge portions 54 at their lower ends to normally support the plate 46 in a generally horizontal position with the inner end thereof closely adjacent the reel 18. The plate 46 has an opening 56 therein through which the fishing line 30 extends to guide the line so that it will be properly wound onto and unwound from the reel 18. The reel 18 is made in two pieces, preferably of plastic, and includes a circular disc 58 and a cup-shaped member 60 secured thereto. The disc 58 is provided with an integral projection 62 which is adapted to frictionally engage the inner end of the drag plate 46 upon rotation of the reel in either direction. The shape of the projection 62 is such that the drag plate 46 will engage the projection 62 with just sufficient friction to prevent unwinding of the line from the reel due to very light pulls on the line, such as might occur due to water currents or by the weight of the baited line. However, the frictional resistance to rotation of the reel is readily overcome by a heavier pull on the line, as when a fish strikes the bait.

It will be noted that the under side of the drag plate 46 is provided with a thickened portion 64 at its inner end. When a relatively heavy bait is used on the line 30, the plate 46 may be inverted so that the portion 64 thereof will slope upwardly toward the reel 18, thereby presenting more interference to passage of the projection 62 on the reel past the drag plate 46, thus increasing the frictional resistance to rotation of the reel. The drag plate 46 is also preferably made of plastic and will bend sufficiently to allow rotation of the reel in either direction by operation of the crank 24 or by a strong pull on the line. The plate 46 may be inverted by bending the inner end downwardly to disengage the plate from the ledge portions 54 of the lugs 52 and withdrawing the outer end 48 of the plate from the opening in the boss 50. The plate is then reassembled in the proper position in a similar manner.

It will be noted that the circular rim 14 on the base portion 12 of the housing extends entirely around the opening in the ice so that the water within the opening is completely shielded from the wind by the hollow housing 10. It has been found that this construction retards freezing of the water even at temperatures below zero. The rim 14 will readily become embedded in any snow or slush at the edge of the hole in the ice so that the tip-up will not be blown over even by high winds.

What I claim as my invention is:

1. A tip-up comprising a housing, a reel within said housing, a crank rotatably mounted in a wall of said housing and having an external handle portion, said reel being mounted on the inner end of said crank within said housing for rotation therewith, a signal member projecting through an opening in said housing and having a visual signal flag disposed externally of said housing and an inner end pivoted on said reel on an axis parallel to and offset from the axis of rotation of said reel, whereby said signal flag is continually oscillated externally of said housing as a fishing line is unwound from said reel.

2. A tip-up according to claim 1 including means for frictionally resisting unwinding of said reel.

3. A tip-up according to claim 2 wherein said means comprises a plate adjustably mounted within said housing and engageable with said reel.

4. A tip-up according to claim 3 wherein said plate has an opening therein through which a fishing line wound on said reel is adapted to extend for guiding the line as it is wound onto and off of said reel.

5. A tip-up according to claim 2 wherein said means comprises a projection on said reel, a drag plate having one end thereof engaged by said projection upon rotation of said reel, said drag plate having a tapered surface on one side of said one end thereof, and means detachably mounting said drag plate on said housing to permit said plate to be inverted to offer varying frictional resistance to unwinding of said reel.

6. A tip-up according to claim 1 wherein said housing has an external portion thereof adapted to obscure said signal flag when the said inner end of said signal member is at the bottom of its path of rotation around the axis of said reel.

7. A tip-up according to claim 1 wherein said housing is adapted to completely cover an opening in the ice over which it is positioned to retard freezing of the water therein.

8. A tip-up according to claim 7 wherein said housing has a circular, generally flat base provided with a downwardly extending rim adapted to seat on the ice around an opening therein, said housing being hollow and completely covering said opening.

9. A tip-up according to claim 8 wherein said housing has a housing portion extending upwardly from said base, said reel being disposed in said housing portion, said signal member extending upwardly through a slot in the top wall of said housing portion.

* * * * *